(12) United States Patent
Singhal et al.

(10) Patent No.: US 7,634,458 B2
(45) Date of Patent: Dec. 15, 2009

(54) PROTECTING NON-ADULT PRIVACY IN CONTENT PAGE SEARCH

(75) Inventors: Nikhil Singhal, Redmond, WA (US); Michael I. Torres, Seattle, WA (US); Charles K. Martz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 11/458,926

(22) Filed: Jul. 20, 2006

(65) Prior Publication Data

US 2008/0021903 A1    Jan. 24, 2008

(51) Int. Cl.
G06F 17/30 (2006.01)
(52) U.S. Cl. ............... 707/2; 707/10; 707/200
(58) Field of Classification Search ......... 707/1–3, 707/10, 100, 200, 101, 203; 709/217, 219, 709/225, 229; 705/1
See application file for complete search history.

(56) References Cited

U.S. PATENT DOCUMENTS

| | | | |
|---|---|---|---|
| 6,253,198 B1 * | 6/2001 | Perkins | 707/3 |
| 6,631,369 B1 | 10/2003 | Meyerzon et al. | |
| 6,675,205 B2 * | 1/2004 | Meadway et al. | 707/10 |
| 6,983,379 B1 | 1/2006 | Spalink et al. | |
| 7,249,315 B2 * | 7/2007 | Moetteli | 715/234 |
| 2002/0038431 A1 | 3/2002 | Chesko et al. | |
| 2002/0143961 A1 | 10/2002 | Siegel et al. | |
| 2002/0194358 A1 | 12/2002 | D'Aviera | |
| 2003/0069741 A1 | 4/2003 | Hoyer et al. | |
| 2004/0034799 A1 * | 2/2004 | Mikami | 709/229 |
| 2004/0044962 A1 | 3/2004 | Green et al. | |
| 2004/0093414 A1 | 5/2004 | Orton | |

(Continued)

FOREIGN PATENT DOCUMENTS

EP    1 327 942 A2    7/2003

(Continued)

OTHER PUBLICATIONS

MSN Kids, Information for Kids/ Information for Parents, "More information about MSN's kids Web sites for parents and other interested adults:" http://kids.msn.com/privacy/default.aspx.

(Continued)

*Primary Examiner*—Mohammad Ali
*Assistant Examiner*—Marc R Filipczyk
(74) *Attorney, Agent, or Firm*—Vierra Magen Marcus & DeNiro LLP

(57) ABSTRACT

Requests received from bots for non-adult personal content pages are processed to prevent the content pages from being stored and indexed. Excluding non-adult personal content pages from access to search engines protects the privacy of the non-adult associated with the page. A personal content page may be implemented as and/or include a profile, a blog, or other content and/or personal information for the non-adult. A recognized bot which sends a content request for a non-adult personal content page is not provided with meta-data allowing a search engine to index the page. Additionally, the bot is instructed to not access and/or index the non-adult personal content page. By not providing personal content page meta-data to the bot and instructing the bot to not access and/or index the non-adult owner's page, the bot should not acquire information regarding the personal content page.

18 Claims, 7 Drawing Sheets

U.S. PATENT DOCUMENTS

| | | |
|---|---|---|
| 2004/0139025 A1 | 7/2004 | Coleman |
| 2005/0071766 A1 | 3/2005 | Brill et al. |
| 2007/0055642 A1* | 3/2007 | Kim et al. ........................ 707/1 |
| 2008/0005125 A1* | 1/2008 | Gaedeke ........................ 707/10 |
| 2008/0208831 A1* | 8/2008 | Farago et al. ................... 707/5 |

FOREIGN PATENT DOCUMENTS

| | | |
|---|---|---|
| EP | 1 327 942 A3 | 4/2006 |

OTHER PUBLICATIONS

CXO Media Inc., CIO News Alerts, "Judge: Google Must Hand Over Index Data", http://www.cio.com/blog_view.html?CID=19288, Mar. 20, 2006.

Westar Aerospace & Defense Group, Privacy Statement, Westar Aerospace & Defence Privacy Policy, http://www.westar.com/privacy/index.asp.

* cited by examiner

<META NAME="robots" CONTENT="noindex,nofollow">

Figure 7A

<META NAME="search.st" CONTENT="Charlie's+Space">
<META NAME="search.sa" CONTENT="cmartztest1">
<META NAME="search.market" CONTENT="en-US">
<META NAME="search.pt" CONTENT="Blog">

Figure 7B

PROTECTING NON-ADULT PRIVACY IN CONTENT PAGE SEARCH

BACKGROUND

The Internet has become a popular medium for sharing information. In particular, web services which provide a network of personal content pages are growing in popularity. These web services allow users of different ages, including those not of legal adult age, to generate and maintain a personal content page. The personal content page may be customized by the page owner to include photos, a blog, video and other personal information. The personal information may include profile information, geographical information, age and contact information.

A network of personal content pages may be crawled and indexed by a web crawler. The search engine utilizes search terms received from a user to search personal content page data that has been crawled and indexed. The personal content page data may include meta-data associated with data contained in each content page. The meta-data may indicate hobbies, geographic information, and other data associated with the content page and the page owner. When meta-data and associated content for a content page matches the search terms of a search, a link for the corresponding content page is provided in the search results.

The meta-data associated with a page is retrieved by a web crawler. A web crawler requests a personal content page from a content page web service. In response to the request, the content page web service may provide access to the web page as well as a set of meta-data associated with the requested page. The web crawler provides the received meta-data to a data store with other content page data. This data can then be accessed by a search engine.

Search engines with access to personal content pages can be used by predators to retrieve information about non-adult page owners. This may ultimately threaten the safety of the non-adult if the predator uses the information to contact, harm or otherwise take advantage of the non-adult page owner. It would be valuable to protect the privacy of non-adult page owners.

SUMMARY

The present technology, roughly described, processes web page access requests received from bots to protect the privacy of a non-adult associated with the web page. The web page may be a personal content page, which may be implemented as and/or include a profile, a blog, or other web page content which may provide personal information for the non-adult. A recognized bot which sends a content request for a personal content page for a non-adult is not provided with search specific meta-data which would allow a search engine to index the page. The withholding of the meta-data prevents effective indexing by search engines. Additionally, the bot is instructed to not access the personal content page associated with the non-adult.

One embodiment of processing content requests includes determining if the request is received from a bot. A bot is recognized as a sender if sender identification information matches a list of known bots. If a request received from a bot is for a content page associated with a non-adult, no indexing meta-data is provided to the bot. This prevents the bot from adding meta-data to a database which may be searched by a search engine. By not including personal content page data associated with a non-adult in database, predators looking to contact, meet, or otherwise take advantage of non-adults may not find the personal content page through the search engine. In some embodiments, meta-data is not provided to any request for a content page associated with a non-adult. In some embodiments, an instruction to not access the content page is provided to the requesting entity that requests content page data for a content page owned by someone not of legal age.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 7A is an example of metadata sent in response to a bot request for a minor's content page.

FIG. 7B is an example of metadata sent in response to a bot request for an adult content page.

DETAILED DESCRIPTION

Figure 1:
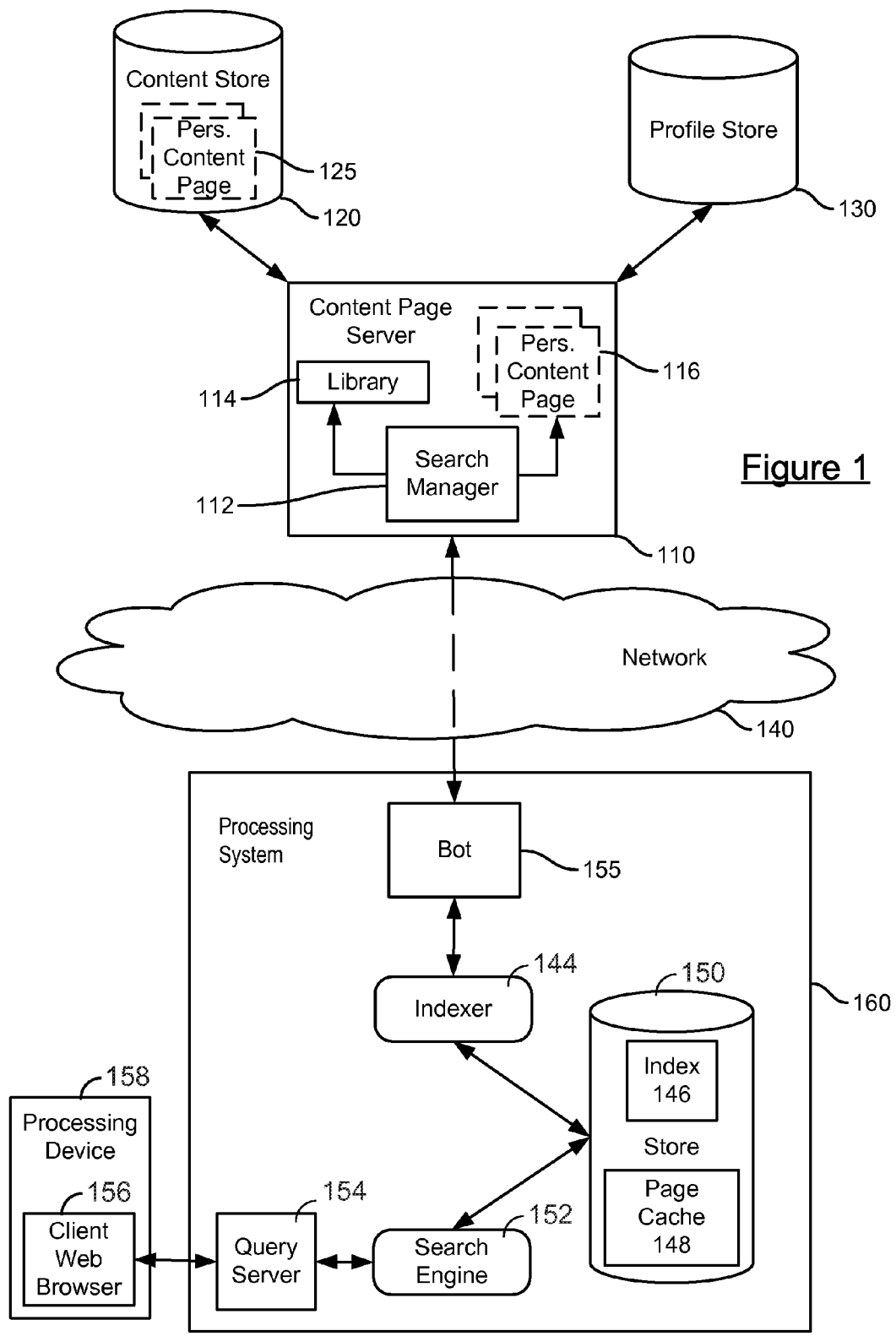
FIG. 1 is an embodiment of a system for processing content page search requests.

Web page access requests received from bots are processed to protect the privacy of a non-adult associated with the web page. A bot is a program that requests access to website content, parses accessed websites, and saves website data. The web page may be a personal content page, which may be implemented as and/or include a profile, a blog, or other web page content which may provide personal information for the non-adult. A recognized bot which sends a content request for a personal content page for a non-adult is not provided with meta-data which would allow a search engine to index the page. Additionally, the bot is instructed to not access and/or index the personal content page associated with the non-adult.

By not providing personal content page meta-data to the bot and instructing the bot to not access and/or index the non-adult owner's page, the bot should not acquire information regarding the personal content page. Keeping non-adult web page information from the bot prevents any information from the non-adult's personal content page from being saved to a database which is accessible to a search engine. Thus, anyone looking for personal content regarding non-adults would not be able to access a personal content page of the non-adult through the search engine associated with the bot.

A bot is a program that requests access to website content, parses accessed websites, and indexes and/or saves website data. Bots are also known as web crawlers, spiders, and worms. In operation, a bot receives a link, accesses the URL associated with the link and retrieves the HTML data at the URL link. In some embodiments, non-HTML data may also be indexed, such as video, audio, images, etc. For purposes of discussion only, HTML data will be discussed from this point forward. The bot may also receive meta-data associated with the URL link. The HTML data is parsed and stored in a database. The stored data is indexed using data retrieved from the page parsing and/or the received meta-data. The stored data may then be retrieved through a search engine in response to a query. After saving the data, the bot retrieves links from the parsed HTML data and repeats the process.

Instructions to a bot to not access a particular web page should prevent the bot from accessing the page. Policies exist for preventing bots from accessing a website not intended to be accessed by a search engine. Though no standards exist for these policies, several policies involving rules of politeness exist for web-based bots. Examples of these policies include the Robot Exclusion Standard and the Robot Exclusion Protocol. These policies specify procedures for instructing bots when it is acceptable to scan web page content and what content should not be scanned or accessed. In one embodiment, the present technology may utilize statements, methods and other techniques prescribed by these policies in instructing a bot to not access a particular personal content page. This is discussed in more detail below.

FIG. 1 is an embodiment of a system for processing personal content page search requests. The system of FIG. 1 includes content page server 110, content store 120, profile store 130, network 140, and processing system 160. Content page server is in communication with content store 120 and profile store 130. Content page server 110 is also in communication with processing system 160 over network 140. In one embodiment, network 140 may be implemented as the Internet.

Content page server 110 may include search manager 112, library module 114, and one or more content pages 116. Search manager 112 may be comprised of code for handling personal content page requests. The code may be stored entirely on content page server 110 or be distributed over more than one server. In some embodiments, content page server 110 may be implemented as a web service front end server. For example, content page server 110 may be implemented as a front end server for a web service which provides personal content pages.

Library module 114 may include a list of known bots. In some embodiments, an administrator or developer may also add bot information to the library. Library module 114 may be queried to determine if a particular bot is contained in a list of known bots. Library module 114 is discussed in more detail below.

In one embodiment, library 114 may be implemented using "ASP.net" of Microsoft Corporation of Redmond, Wash. ASP.net is a service for providing dynamic content within a web page. As part of providing dynamic web page content, the service may include one or more libraries. One of the one or more libraries may include information regarding known bot types. In some embodiments, the library may be updated periodically by an administrator of the ASP.net service.

In some embodiments, ASP.NET is a type of active server page. An active server page (ASP) is an HTML page that includes one or more scripts that are processed on a web server before the page is sent to the user. An ASP is somewhat similar to a server-side include or a common gateway interface (CGI) application in that all involve programs that run on the server, usually tailoring a page for the user. Typically, the script in the web page at the server uses input received as the result of the user's request for the page to access data from a database and then builds or customizes the page on the fly before sending it to the requestor. ASP.NET is a type of Active Server Page that allows a web site builder to dynamically build web pages on the fly by inserting queries to a relational database in the Web page. ASP.NET supports code written in compiled languages such as Visual Basic, C++, C#, and Perl, and features server controls that can separate the code from the content.

In some embodiments, the system herein does not need to determine whether the request is received from a bot. The system may receive a request and determine if the request is received for a content page having an owner that is not of legal age. If the content page owner is not of legal age, the response to the bot may indicate that the bot is not to index the page, not to follow links to the page, not to otherwise access content data associated with the page, and/or provide other instructions.

Personal content pages may be implemented as and/or include a blog, a user profile or other personal content for the user. A personal content page is associated with or "owned" by a user if the page is associated with a web service account created and maintained by the user. A personal content page may be stored on content page server 110 as personal content page 116 or on content store 120 as personal content page 125, or both. In some embodiments, data for a personal content page may be distributed over a network of two or more servers. Personal content page are discussed in more detail in U.S. patent application Ser. No. 10/978,558, entitled "Dynamic Content Change Notification," filed on Nov. 1, 2004, having inventors Mike Torez, et al., which is incorporated herein by reference.

Content store 120 may store content for one or more personal content pages. In some embodiments, content page 125 may be stored in whole or in part in content store 120. In some embodiments, content store 120 may store content for user content pages as well as content page preferences. These preferences may include a setting indicating whether a user's personal content page is public or private as well as other preferences. Content store 120 is in communication with content page server 110 and able to process requests received from content page server 110.

Profile store 130 may store profile information for users accessing a content page server network. In particular, profile store 130 may include profile information for users having a personal content page. The profile information contained in profile store 130 may include a user's name, address, e-mail, birth date, and other data. Profile store 130 is in communication with content page server 110 and may process requests received from content page server 110. In some embodiments, content store 120 and profile store 130 may each be implemented as one or more servers.

Processing system 160 includes bot 155, indexer 144, store 150, search engine 152, and query server 154, and is in communication with client web browser 156 on processing device 158. In some embodiments, a user agent may be implemented on processing device 158 in addition to or instead of client web browser 156. In this case, the user agent may be in communication with processing system 160. A user agent may be implemented as a mobile phone, screen reader, personal data assistant (PDA), or other device. Bot 155 (also called a spider or crawler) visits web pages of various web sites to a list of URLs it maintains according to a priority defined by the spider's creator. For each page it encounters, the crawler reads the page, and follows links to other pages within the site. Bot 152 may return to the site on a regular basis to look for changes. The bot 152 takes a list of seed URLs as its input, and for each URL, determines the IP address of its host name, downloads the corresponding document, and extracts any links contained in it. For each of the extracted links, the bot adds it to the list of URLs to download. If desired, the bot may process the downloaded document in other ways, such as adding it to a page cache 144. In some embodiments, some bots and/or web crawlers allow web site owners to "ping" them with a URL when the content of those URL's change or new content is created).

In addition to retrieving web page information by accessing and reading the page, bot 155 may receive meta-data from a server which provides the page content. In this case, the server may provide meta-data which may be used to index the page. Bot 155 may provide the meta-data to indexer 144, which then stores the meta-data in store 150. In response to receiving a search query (e.g., from a user agent or client web browser 156) having terms that match the stored meta-data, search engine 152 and query server 154 may retrieve information for the content page associated with the meta-data provided to bot 155.

Indexer 144 creates an index 146. The index 146, sometimes called the catalog, is a repository containing a key index of terms in every web page that the spider finds and the corresponding URL. The index is stored in data store 150.

Search engine 152 sifts through the pages recorded in the index to find matches to a search and ranks them in order of relevance according to the engine's ranking algorithm. The query can be quite simple, a single word at minimum, or more complex, with words or phrases joined by Boolean operators to refine and extend the terms of the search.

Generally, search engine 152 operates in response to a request from a user via a user agent 156, such as a web browser, on a processing device 158. A query server 154 (web server) provides a search interface, including a keyword entry form, to the user. When a user on a client based user agent 156, such as a web browser, seeks to provide a search query to the information stored in the data store 150, the user will enter their search in the interface provided in the user agent 156 by the query server 154 which will be provided to the search engine 152. The user may enter key words connected by logical operators such as "and," and "or" which will be used by the search 152 to query the index 146 and retrieve the information according to a ranking system utilized by the search engine 152. The results will be returned by the search engine 152 to the query server 154, which will then present the results and one of any number of multiple formats to user agent 156.

As discussed above, a bot may be a program which requests personal content page data, parses retrieved page data and places index information associated with the data into a search engine index. Examples of bot 155 may include "MSNbot", provided by Microsoft Corporation, of Redmond, Wash., "Googlebot", of Google, Inc., of Mountain View, Calif., and "Slurp", of Yahoo! Inc., of Sunnyvale, Calif. Bot 155 is discussed in more detail below.

Figure 2:
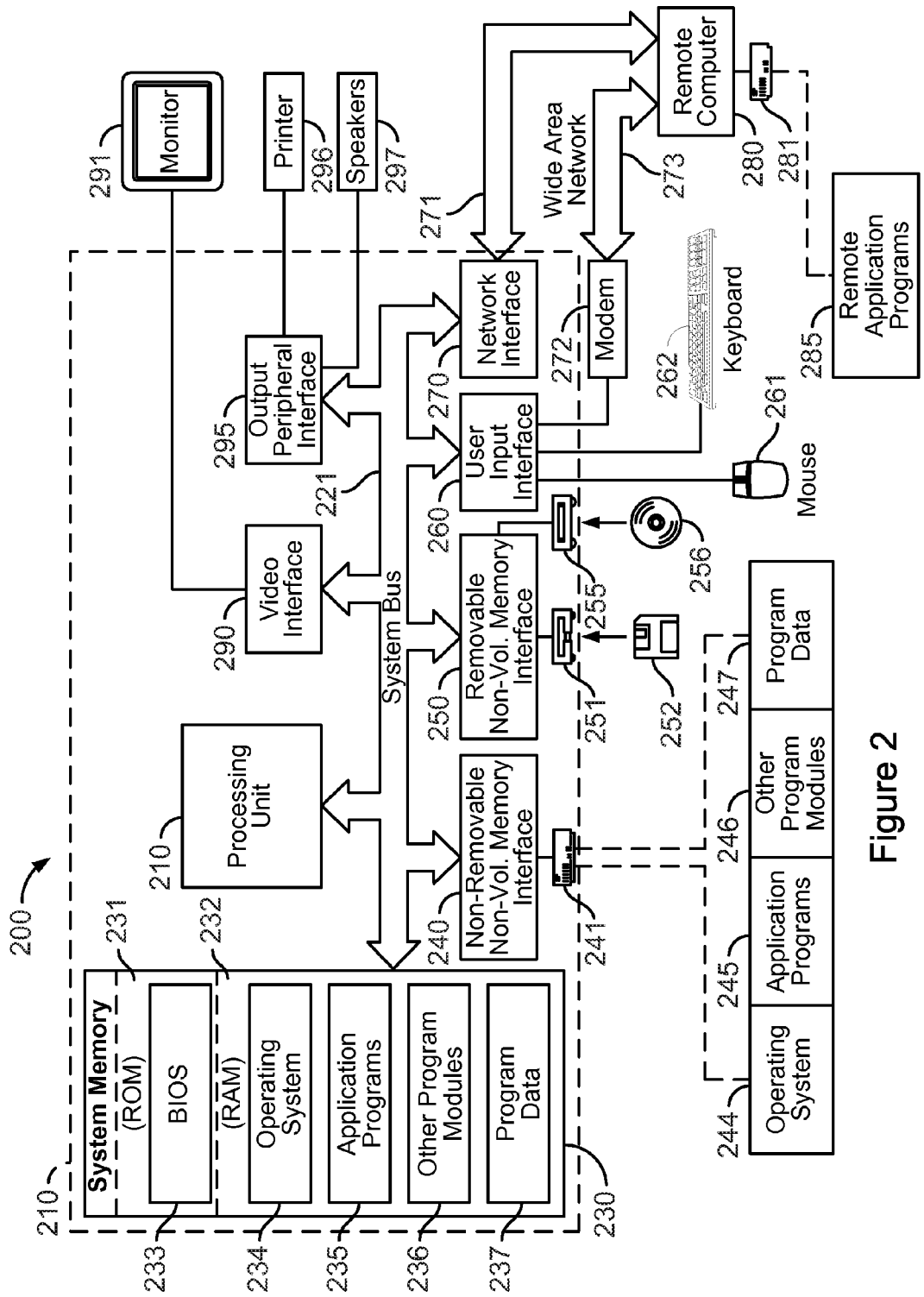
FIG. 2 is an embodiment of a computing environment for implementing the present technology.

FIG. 2 illustrates an embodiment of a computing environment for implementing the present technology. In some embodiments, the computing environment of FIG. 2 may be used to implement content page server 110, bot server 150, content store 120, and profile store 130.

FIG. 2 illustrates an example of a suitable computing system environment 200 on which the present technology may be implemented. The computing system environment 200 is only one example of a suitable computing environment and is not intended to suggest any limitation as to the scope of use or functionality of the technology. Neither should the computing environment 200 be interpreted as having any dependency or requirement relating to any one or combination of components illustrated in the exemplary operating environment 200. In one embodiment, computing environment 200 of FIG. 2 may be used to implement content page server 110, content store 120, profile store 130 and bot server 150 of FIG. 1.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, cell phones, smart phones, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
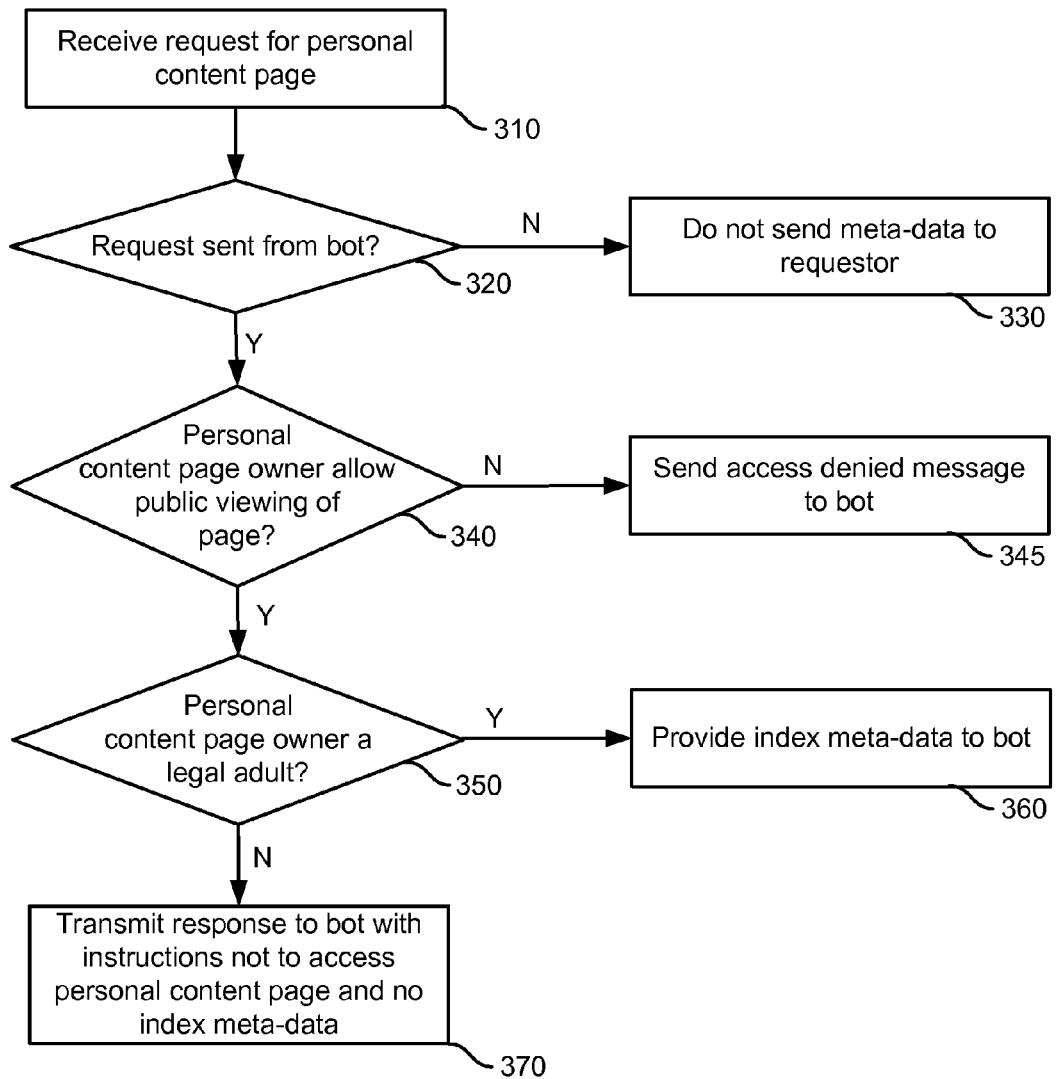
FIG. 3 is a flowchart of an embodiment of a process for processing a content page request.

FIG. 3 illustrates a flowchart of an embodiment of a process for processing a content page request. In some embodiments, the process of FIG. 3 may be performed by search manager 112. First, a request is received for a personal content page at step 310. In one embodiment, the search may be received by search manager 112 over Internet 140.

Next, a determination is made by search manager 112 as to whether the received request was sent by a bot at step 320. To determine if the request was sent by a bot, sender information from the request is compared to a list of known bots. First, the request is parsed to identify sender identification information. Sender identification information is then compared to a list of bots to determine if the sender is recognized as a bot. Determining whether a request is sent from a bot at step 320 is discussed in more detail below with respect to FIG. 4. If the received request is determined to be sent by a recognized bot, the process of FIG. 3 continues to step 340. If the request is not sent by a recognized bot, then meta-data associated with the requested personal content page is not provided in response to the request at step 330. Without the meta-data, the requesting entity is not able to index the content page using the standard meta-data fields used by search manager 112.

Thus, the standard meta-data fields are not provided if the request is not sent by a recognized bot. In some embodiments, the request may be processed further to provide a response which does not include meta-data associated with the personal content page. For instance, the request is processed further to determine if it was received from a user (e.g., from a client application). If the request is received from a user, a link to the request may be sent to the user's application.

In some embodiments, no determination is made as to whether the request is received from a bot. The response to the request may be determined based on whether the owner of the page is not a legal adult and not what entity the request is received from. Accordingly, after receiving a request for a personal content page at step 310, the process of FIG. 3 continues to step 340.

A determination is made by search manager 112 as to whether a personal content page owner allows public viewing of his or her page at step 340. In some embodiments, an owner may select one of the several visibility settings associated with a personal content page. The visibility settings may include a public setting which allows anyone to view the page, a private setting which allows no one to view the content page, a contacts-only setting which only allows people included in the content page owner's contact list to view the page, and other variations of limited viewing. In some embodiments, a visibility setting may be retrieved from a remote server where content page settings are stored. Determining whether a personal content page owner allows public viewing of their page is discussed in more detail below with respect to FIG. 5. If an owner of a personal content page allows the public to view a page, the process of FIG. 3 continues to step 350. If the owner of the personal content page requested by the bot does not allow the public to view his or her content page, an access denied message is sent to the requesting bot at step 345. The access denied message may indicate that that page is unavailable, that the bot does not have access to the particular page, or some other error message.

A determination is made as to whether a personal content page owner is a legal adult at step 350. If an owner is not a legal adult, the personal page content will not be sent to the requesting bot. In some embodiments, the age of a personal content page owner is determined from the page owner's birth date and the current date and the legal adult age. The legal adult age can be configured for each business market. A business market may be a country, geographical area, or some other area which specifies a legal age of an adult. Once the owner's age is determined, the age may be compared to the legal adult age associated with the market in which the page owner resides. Determining whether a personal content page owner is a legal adult is discussed in more detail below with respect to FIG. 6. In one embodiment, step 350 is performed for each request received from a bot for a personal content page. Performing step 350 for each request prevents stale data from being provided or acted upon. If a personal content page owner is determined not to be a legal adult, the process of FIG. 3 continues to step 370. If a personal content page owner is determined to be a legal adult, the process of FIG. 3 continues to step 360.

If a personal content page owner is determined to be a legal adult, index meta-data is provided to the requesting bot at step 360. The index meta-data may enable a search engine to retrieve information for the content page in response to receiving search terms that match at least a portion of the meta-data. In some embodiments, in addition to the indexed metadata, other page content may be accessed by the requesting bot as well. An example of index metadata provided to a bot at step 360 is provided in FIG. 7B and discussed in more detail below.

If a personal content page owner is determined not to be an adult at step 350, a response is transmitted to the bot with no index meta-data and instructions not to access and/or index the personal content page at step 370. In this case, the response will not include any page content or metadata enabling a search engine to index the content page. Rather, the response may include a "no-index" entry metadata and an instruction to the bot not to access and/or index the page. In some embodiments, page content will still be emitted, but the requesting bot will be instructed not to index and or access the content. In most cases, a bot will adhere to the instruction to not access a content page according to politeness policies followed by most bots and web crawlers. An example of the metadata provided to a bot at step 370 when the personal content page owner is not a legal adult is provided in FIG. 7A and discussed in more detail below.

Figure 4:
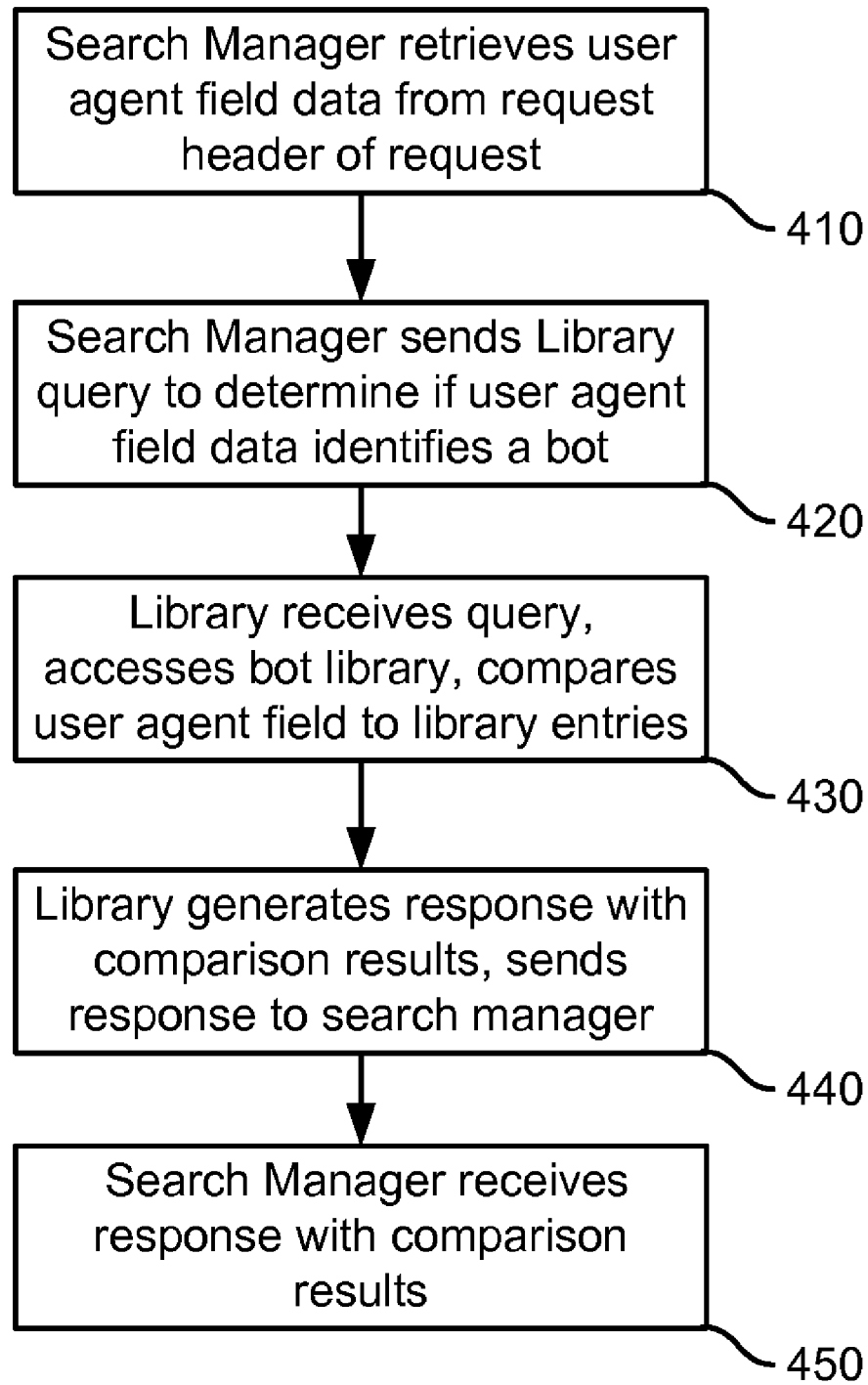
FIG. 4 is a flowchart of an embodiment of a process for identifying a request from a bot.

FIG. 4 is a flowchart of an embodiment of a process for identifying a request from a bot. In one embodiment, the process of FIG. 4 provides more detail for step 320 of the process of FIG. 3. First, search manager 112 retrieves data from a user-agent field of the request header of the received content page request at step 410. A user-agent field is a standard field in requests which conform to the HTTP 1.0 standard. An example of a user-agent field for a web user using "Internet Explorer 6" web browser, by Microsoft Corporation, of Redmond Wash., is as follows:

User-Agent: Mozilla/4.0 (compatible; MSIE 6.0; Windows NT 5.2; SV1; .NET CLR 1.1.4322; .NET CLR 1.0.3705; InfoPath.1; .NET CLR 2.0.50727).

To retrieve the user-agent field, search manager 112 parses the received request. As a result of parsing the request, search manager 112 retrieves the data in with the user-agent field.

Next, search manager 112 sends a query to library 114 to determine if the retrieved user-agent field data identifies a bot at step 420. The query to library 114 includes the retrieved data from the request user-agent field. The purpose of the query is to determine if the data retrieved from the request matches any bot listed in a list of bots.

Library 114 receives the query, accesses a list of bots and compares the user agent field data to the bot list entries at step 430. Examples of some bot entries which may be contained in the user agent field may include those listed at http://www.robotstxt.org/wc/active/html/index.html. For example, some bot entries may be "MSNBOT/0.1", associated with MSN Search Engine by Microsoft Corporation, and "Googlebot/2.X" associated with Google, Incorporated. After comparing the user agent field to the library bot entries, library 114 generates a response with results of the comparison and sends the response to search manager 112. The response may include a parameter indicating whether the comparison indicated a matching library bot or not. Search manager 112 receives the response sent by library 114 which includes the comparison results. Upon receiving the response, search manager 112 parses the response to determine if the data within the user agent field indicates that the request received at step 310 was received from a recognized bot.

Figure 5:
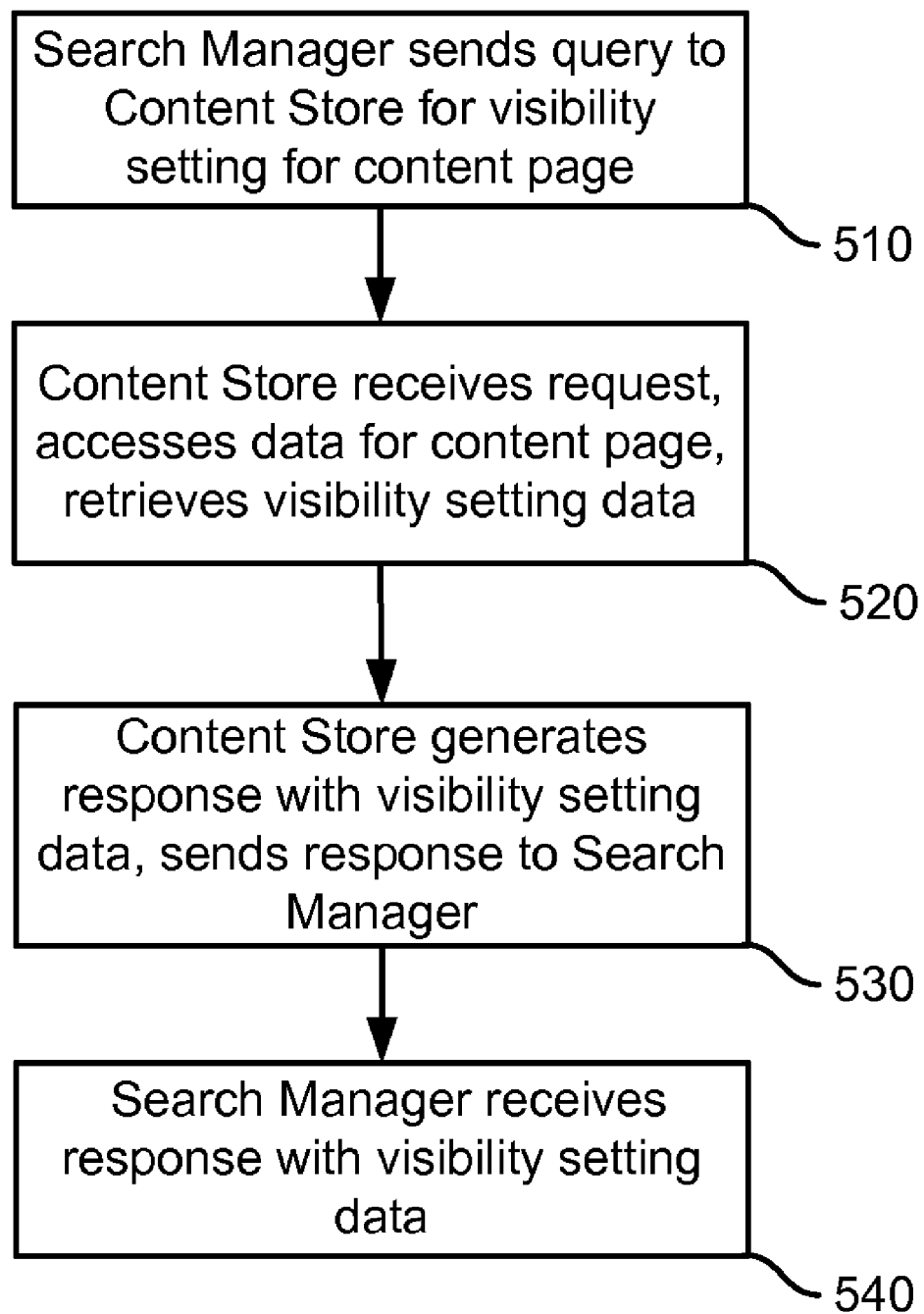
FIG. 5 is a flowchart of an embodiment of a process for determining if a content page is configured to be shared.

FIG. 5 is a flowchart of an embodiment of a process for determining if a content page has a visibility setting of public. In one embodiment, the process of FIG. 5 provides more detail for step 340 of the process of FIG. 3. First, search manager 112 sends a query to content store 120 for a visibility setting for the content page requested at step 310. In one embodiment, the query sent to content store 120 is sent with content page identification information and a request for the visibility setting for the particular content page. In some embodiments, the request is a query as to whether the visibility setting is set to public. Content store 120 receives the request, accesses data for the identified content page and retrieves the visibility setting data at step 520. After retrieving the data, content store 120 generates a response with page visibility setting data and sends the response to search manager 112 at step 530. In some embodiments, content store 120 sets a response parameter to true or false, wherein a setting of true indicates the content page is configured to be viewed by the public. In this embodiment, the response parameter is included in the response. In some embodiments, the visibility setting itself is included in the response.

Search manager 112 receives the response sent by content store 120 at step 540. Search manager 112 makes the determination at step 340 based on the content of the response received from content store 120. If the visibility setting data associated with the content page indicates that the page may be viewed by the public, search manager 112 determines that the personal content page owner allows public viewing for the page. Otherwise a determination is made that the content page owner does not allow for public viewing of the page.

Figure 6:
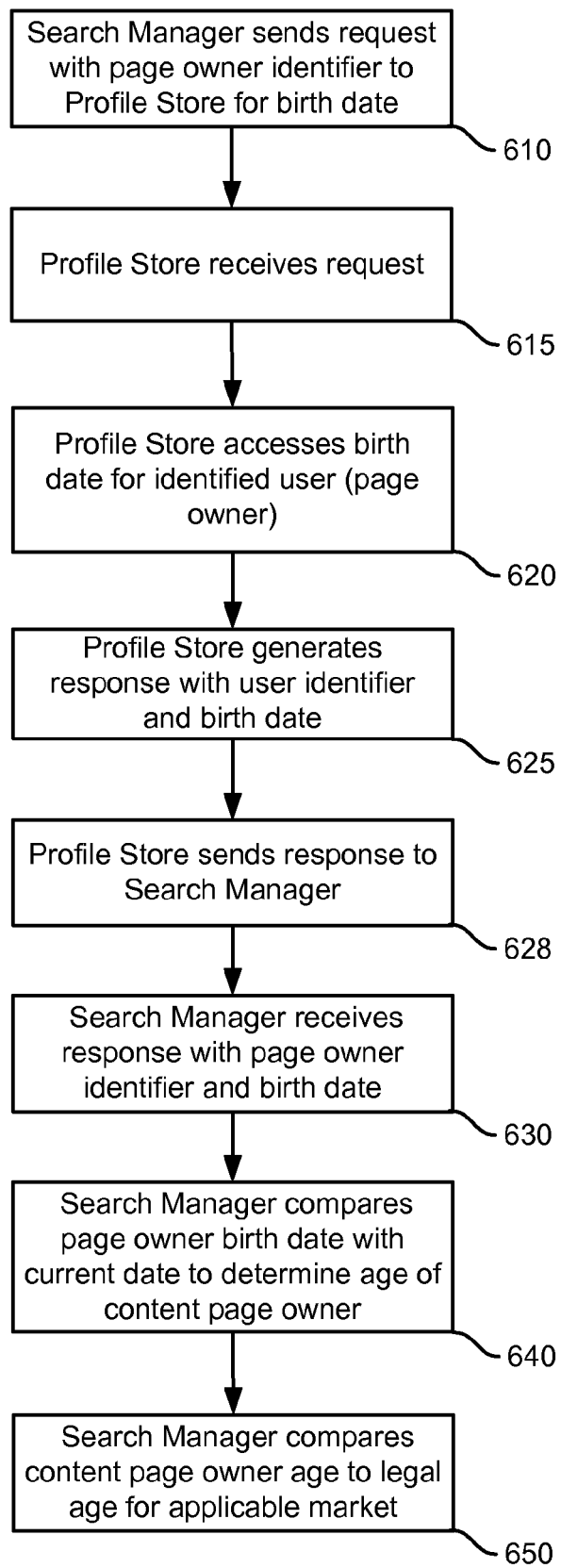
FIG. 6 is a flowchart of an embodiment of a process for determining if a content page owner is a legal adult.

FIG. 6 illustrates a flowchart of an embodiment of a process for determining if a content page owner is a legal adult. In one embodiment, FIG. 6 provides more detail for step 350 of the process of FIG. 3. Search manager 112 sends a request with page owner identification information and a birth date query to profile store 130 at step 610. The birth date query requests the birth date of the user associated with the identification information. In one embodiment, when profile store 130 is compatible with Microsoft's PASSPORT Service, the content page owner identification information is a passport unique identifier (PUID). In other embodiments, the content page owner identification information may be some other unique identifier associated with the user.

Next, profile store 130 receives the request at step 615. Profile store 130 then accesses the birth date for the identified user (the page owner) at step 620. Profile store 130 accesses the birth date for the identified page owner in response to receiving the request. Profile store 130 generates a response to the personal content page owner containing the user identifier and the owner's birth date and sends the response to Search Manager 112 at step 628.

Search manager 112 receives the response with the personal content page owner identifier and birth date at step 630. Search manager 112 then compares the content page owner's birth date with the current date at step 640. Comparing the birth date and current date enables the search manager 112 to determine the current age of the content page owner.

Next, search manager 112 compares the personal content page owner's age to the legal adult age for the applicable market at step 650. As such, search manager 112 determines if the content page owner is a minor or an adult according to the legal adult age for the applicable market. In some embodiments, different markets or geographical areas may have a different legal adult age. For example, the legal adult age in the United States may be eighteen and the legal adult age in Korea may be twenty. Thus, if the content page owner's age is greater than or equal to the legal adult age for the applicable market in which the content page owner resides, the owner is not a minor and is considered a legal adult. Otherwise, the content page owner is determined to be a minor and not a legal adult.

FIG. 7A is an example of no-index metadata sent in response to a bot request for a personal content page owned by a non-adult. In one embodiment, the meta-data of FIG. 7A is sent to a requesting bot at step 370 of the process of FIG. 3. The meta-data of FIG. 7A reads:

META NAME = "robots" CONTENT = "noindex, nofollow.

In one embodiment, this metadata is directed towards recognized bots (identified as "robots"). The one or more tags included in the response enables users may not always adjust, control or manage the robots.txt file at their sites to keep their content out of search services. The "noindex" content of the meta-data indicates that the bot should not index the contents of this page and add it to their search services. Further, the "nofollow" content of the metadata indicates that the should not follow (or explore) links from this page. Typically, most bots or crawlers will respect the provided "nofollow" meta-data in accordance with recognized bot politeness policies. By following the "nofollow" meta-data, bots will not attempt to access data or other content from the personal content page previously requested by the bot.

FIG. 7B is an example of metadata sent in response to a bot request for a personal content page owned by an adult. The meta-data of FIG. 7B is an example of meta-data sent at step 360 in the process of FIG. 3. The metadata at FIG. 7B includes metadata as follows:

<META NAME="search.st" CONTENT="Charlie's+Space">
<META NAME="search.sa" CONTENT="cmartztest1">
<META NAME="search.market" CONTENT="en-US">
<META NAME="search.pt" CONTENT="Blog">.

The metadata indicates a site title of "Charlie's Space", site alias of "cmartztest1", the market associated with the content page "en-US" and the type of page "Blog" associated with the requested link. The metadata provided in FIG. 7B may be used to index the personal content page in a data store. The meta-data of FIG. 7B is intended only as an example. As such, other metadata may be used, such as nick name, display name, gender, age, location, and occupation.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for processing content requests, comprising:
   receiving a request to access a content page from a bot associated with a search engine, wherein the content page is associated with an owner;
   accessing a profile store associated with the content page, wherein the profile store contains personal information related to the content page owner;
   obtaining a date of birth of the content page owner from the profile store;
   obtaining a geographical region associated with the content page owner from the profile store;
   determining, using a processing system, whether the content page owner is of adult age based on the date of birth obtained from the profile store and the geographical region obtained from the profile store; and
   if the content page owner is not of adult age, providing a response to the bot indicating that the content page should not be indexed, wherein the response does not contain any meta-data associated with the content page.

2. The method of claim 1, wherein said step of determining whether the content page owner is of adult age includes:
   determining the age of the content page owner based on the obtained date of birth of the content page owner; and
   determining whether the age of the content page owner is less than an age of majority as established by law in the geographical region associated with the content page owner.

3. The method of claim 2, wherein said step of determining the age of the content page owner includes:
   comparing the obtained date of birth of the content page owner to the current date.

4. The method of claim 1, wherein the response includes a tag indicating the bot should not index the content page.

5. The method of claim 4, wherein the tag is a no-index tag.

6. The method of claim 1, the content page having meta-data associated with the content of the content page, the response not including the meta-data.

7. The method of claim 1, further comprising:
determining if the content page owner allows the public to view the content page; and
if the content page owner does not allow the public to view the content page, providing a response to the bot indicating that access to the content page is denied.

8. One or more processor readable storage devices having processor readable code stored on said processor readable storage devices, said processor readable code for programming one or more processors to perform a method comprising:
providing at least one content page sever in communication with a profile store, wherein a content page is stored on the at least one content page server and the profile store contains profile information of an owner associated with the content page;
identifying a bot request to access the content page;
accessing the profile store to obtain a date of birth and geographical region associated with the content page owner;
identifying whether the content page owner is a minor based on the date of birth and geographical region associated with the content page owner; and
if the content page owner is identified as a minor, providing a response to the bot request indicating that the bot should not index the content page.

9. The one or more processor readable storage devices of claim 8, said step of identifying a bot includes:
retrieving sender identification information from the bot request; and
determining the sender identification information is associated with a bot.

10. The one or more processor readable storage devices of claim 9, wherein said step of determining the sender identification information is associated with a bot includes:
determining the sending identification information matches an entry in a list of bots.

11. The one or more processor readable storage devices of claim 8, said step of identifying whether the content page owner is a minor includes:
determining the age of the content page owner from the obtained date of birth; and
determining whether the age of the content page owner is less than an age of majority as established by law in the obtained geographical region.

12. The one or more processor readable storage devices of claim 8, wherein the response does not include content data for the content page.

13. The one or more processor readable storage devices of claim 8, wherein the response includes meta-data indicating the bot should not retrieve content page data.

14. The one or more processor readable storage devices of claim 8, further comprising:
determining whether the content page owner has provided permission to the bot to access the content page.

15. A method for providing a response, comprising:
providing a profile store associated with a personal content page, wherein the profile store contains a visibility setting associated with the personal content page and a birth date data and a geographical region associated with an owner of the personal content page;
receiving a request to access the personal content page from a crawler program;
retrieving the visibility setting associated with the personal content page from the profile store;
retrieving the geographical region associated with the owner of the personal content page from the profile store;
retrieving the birth date data associated with the owner of the personal content page from the profile store; and
generating a response to the crawler program using a processing system based on the visibility setting, the geographical region, and the birth date data, the response including an instruction for the crawler program to not index the personal content page.

16. The method of claim 15, wherein the response includes a no-index tag.

17. The method of claim 15, wherein the visibility setting indicates the personal content page may be viewed by the requesting crawler program.

18. The method of claim 17, further comprising:
determining whether the personal content page owner is a minor based on the retrieved birth date.

* * * * *

UNITED STATES PATENT AND TRADEMARK OFFICE
CERTIFICATE OF CORRECTION

PATENT NO. : 7,634,458 B2 Page 1 of 1
APPLICATION NO. : 11/458926
DATED : December 15, 2009
INVENTOR(S) : Singhal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this

Ninth Day of November, 2010

David J. Kappos
*Director of the United States Patent and Trademark Office*